UNITED STATES PATENT OFFICE.

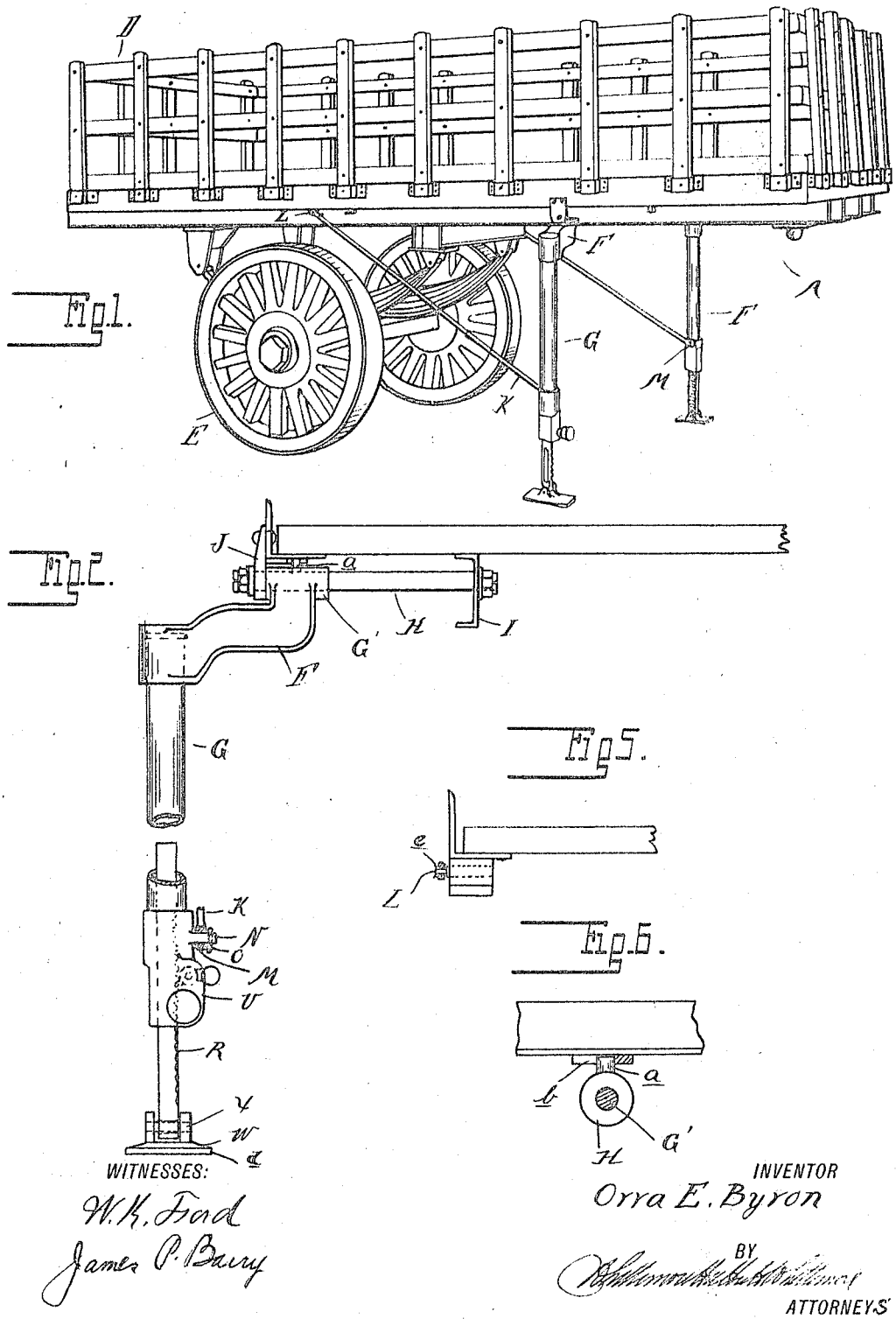

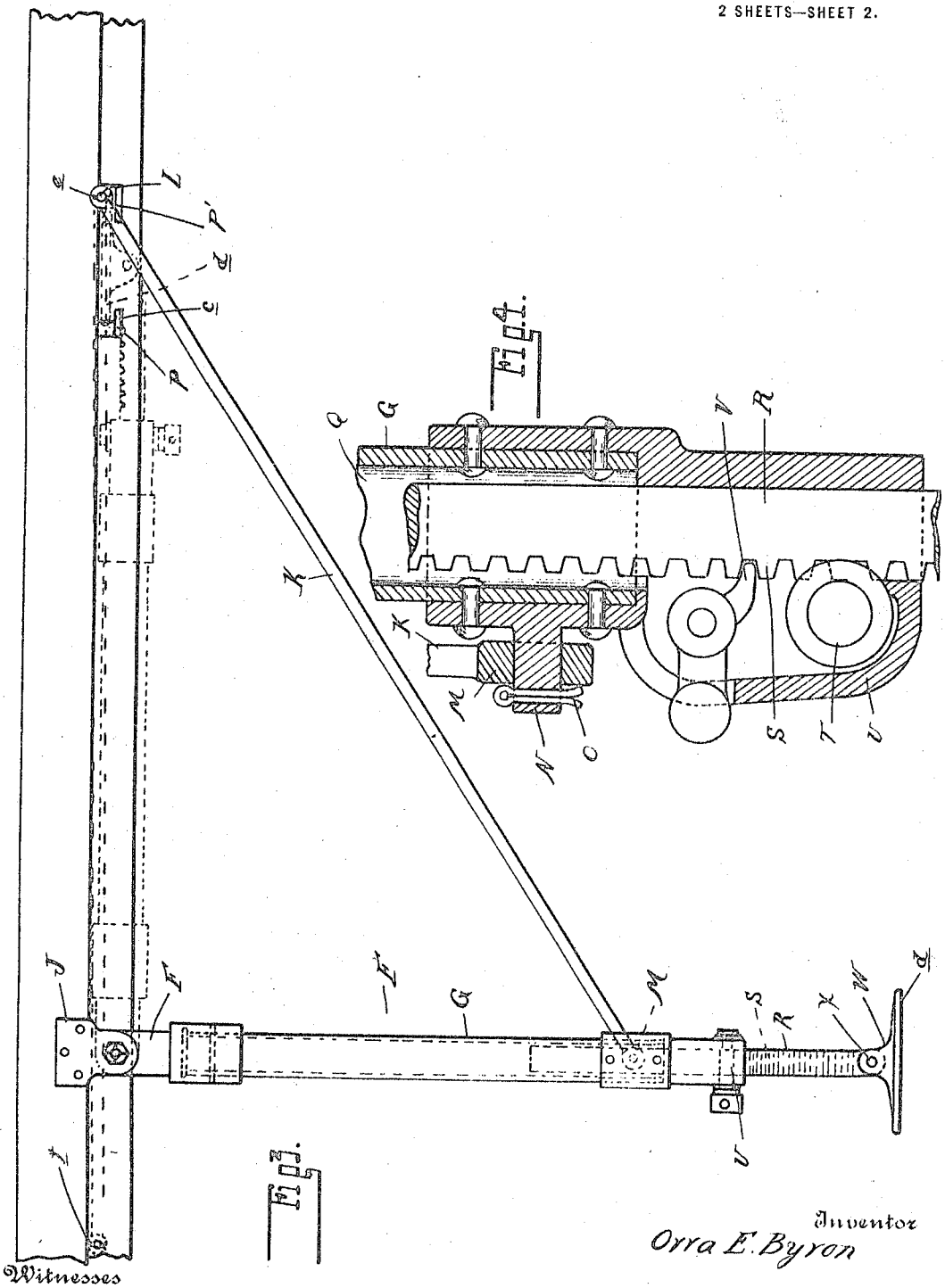

ORRA E. BYRON, OF WALKERVILLE, ONTARIO, CANADA, ASSIGNOR TO STEPHEN A. GRIGGS, OF WALKERVILLE, CANADA.

TRUCK.

1,167,792. Specification of Letters Patent. Patented Jan. 11, 1916.

Application filed April 1, 1915. Serial No. 18,483.

*To all whom it may concern:*

Be it known that I, ORRA E. BYRON, a citizen of the United States of America, residing at Walkerville, in the Province of Ontario and Dominion of Canada, have invented certain new and useful Improvements in Trucks, of which the following is a specification, reference being had therein to the accompanying drawings.

The invention relates to trailers, and more particularly to trailers of the two-wheel type which are adapted to be detachably connected to a tractor.

The invention resides in the novel construction and arrangement of a support which coöperates with the wheels of the trailer to support the latter when the trailer is detached from the tractor; and further, in certain details of construction as will more fully hereinafter appear.

In the drawings,—Figure 1 is a perspective view of a trailer embodying the invention: Fig. 2 is an enlarged fragmentary view illustrating the connection between the support and the trailer frame; Fig. 3 is an enlarged fragmentary side elevation; and Figs. 4, 5 and 6 are sectional detail views.

A designates the trailer, which is attachable to the usual tractor by a connection which allows the trailer to be detached from the tractor. The trailer A is composed of a body portion D mounted upon a pair of wheels E.

F are supports for coöperating with the wheels of the trailer to retain the trailer body in upright position when the trailer is detached from the tractor. Each of these supports comprises a standard G rigidly connected at its upper end to an inwardly-extending arm F provided with a bearing G' that is pivoted upon a shaft H extending transversely of the trailer body. One end of the shaft H is supported by one of the longitudinal beams I of the trailer body, while the other end of the shaft is carried by a bracket J suitably connected to the body of the trailer. The standard is preferably reinforced by means of a brace K in the form of a rod having one end pivotally connected at L to the body of the trailer and having at its opposite end an eye M that engages over a stud N on the standard.

O is a cotter pin for retaining the eye M upon the stud N.

P P' are brackets having laterally-extending portions $c$ spaced a sufficient distance to receive a foot $d$ on the leg.

With the structure so far described, when it is desired to support the trailer the legs are extended as shown in Fig. 1, but when the trailer is connected to the tractor the legs are folded into the position shown in dotted lines in Fig. 3. To fold the legs the cotter pin O is removed from the stud N and the eye M is detached from the stud. The cotter pin $e$ is also removed from the stud L and the rod detached from the stud. The leg is then moved upwardly about the shaft H as a pivot and then moved inwardly along the shaft H to allow the foot $d$ to be slid laterally into engagement with the portion $c$ of the brackets P P', as shown in dotted lines in Fig. 3. One end of the rod is then engaged with the pin L and the opposite end engaged with a pin $f$ on the frame. In this position the rod secures the foot $d$ against disengagement from the brackets P P'.

I find it desirable to prevent inward movement of the bearing portion G along the shaft H when the leg is extended, and to this end the bearing portion has an outwardly-projecting lug $a$ that is adapted to engage a socket portion $b$ on the frame. To engage the lug $a$ with the socket portion the bearing G must be slid laterally along the shaft H while the standard G is in raised position until the lug $a$ alines with the end of the socket. When the leg is lowered the outer end of the pin $a$ is positioned within the socket.

Preferably each of the supports is provided with a jack. Thus as shown, the standard is composed of a hollow section Q within which is telescoped a section R. The section R is provided on one side thereof with a rack S which is engaged by a pinion T journaled in a bearing or housing U at the lower end of the section Q. The member T has a portion extending without the housing and provided with openings for receiving an actuating rod. V is a gravity dog acting normally to prevent downward movement of the section Q upon the section R. W is a foot carried by the section R and pivoted thereto as at X.

The support described is simple in construction, and when folded, is very compact. When extended it is rigidly held against accidental collapsing by the brace rod K. Furthermore, the laterally-extending arms allow the standards to be sufficiently spaced to permit the tractor to be readily backed therebetween into position to be coupled onto the trailer. By actuating the jacks which form a part of the supports, the height of the latter may be varied as desired.

While I have shown and described a very desirable form of the invention, I do not wish to limit my protection to the particular structure illustrated.

What I claim as my invention is:—

1. The combination with a two-wheel trailer, of supports arranged upon opposite sides of the trailer, each comprising a laterally-extending arm pivotally and slidably connected to the trailer and a standard attached to the arm, and a brace rod detachably connected to said standard.

2. The combination with a two-wheel trailer, of supports arranged upon opposite sides of the trailer, each comprising a laterally-extending arm and a standard carried by said arm, the arm being provided with a bearing, a shaft extending transversely of the trailer and upon which said bearing is mounted for longitudinal and rocking movement, and a brace rod having one end connected to the trailer and having the other end detachably connected to the standard.

3. The combination with a two-wheel trailer, of supports arranged upon opposite sides of the trailer, each comprising a laterally-extending arm and a standard carried by said arm, the arm being provided with a bearing, a shaft extending transversely of the trailer and upon which said bearing is mounted for longitudinal and rocking movement, and a brace rod having one end connected to the trailer and having the other end detachably connected to the standard, said rod and said standard being foldable into parallelism with the frame of the trailer.

4. The combination with a two-wheel trailer including its frame, of foldable supports arranged upon opposite sides of the trailer, each comprising a laterally-extending arm and a standard carried by said arm, a shaft arranged beneath the frame of the trailer, there being a bearing on said arm engaging said shaft, a brace rod pivotally connected at one end to the frame of the trailer and having the opposite end detachably connected to the standard, said brace rod when detached from the standard being foldable into parallelism with the frame of the trailer and said support being rockable about said shaft to fold the support into parallelism with the trailer and being longitudinally movable inwardly upon said shaft, and means for retaining said support in its folded position.

5. The combination with a two-wheel trailer including its frame, of foldable supports arranged upon opposite sides of the trailer, each comprising a laterally-extending arm, a standard carried by said arm, a shaft extending transversely of and arranged beneath said trailer frame, said arm being provided with an eye mounted upon said shaft for rocking and longitudinal movement, a brace rod pivotally connected at one end to the frame of the trailer and having an eye at the opposite end, there being a stud upon the standard with which said eye has a detachable engagement, a stud upon the trailer frame for receiving said eye when the brace rod is in stored position, and a bearing upon the trailer frame adapted to engage the standard in the stored position of the latter.

6. The combination with a two-wheel trailer, of supports arranged upon opposite sides of the trailer, each comprising a laterally-extending arm and a standard carried by said arm, the arm being provided with a bearing, a shaft extending transversely of the trailer and upon which said bearing is mounted for longitudinal and rocking movement, a brace rod having one end connected to the trailer and having the other end detachably connected to the standard, and means for holding the bearing from movement longitudinally of the shaft when the leg is in extended position.

7. The combination with a two-wheel trailer provided with a body portion, of supports arranged upon opposite sides of the trailer and secured to the bottom of said body portion, each support comprising a laterally-extending arm and a standard carried thereby, said arm extending laterally beyond the body portion when in operative position and adapted to lie within the body portion when out of operative position.

8. The combination with a trailer, of a support arranged upon said trailer, comprising a laterally-extending arm and a standard carried by said arm, and a shaft extending transversely of the trailer and upon which said arm is mounted for longitudinal and rocking movement.

9. The combination with a vehicle body, of a support pivotally and slidably connected thereto, comprising a standard adapted to be without the plane of the side of the body when in operative position and to lie within the plane of the side of the body when rocked out of operative position.

In testimony wherof I affix my signature in presence of two witnesses.

ORRA E. BYRON.

Witnesses:
JAMES P. BARRY,
ARTHUR D. PULVER.